United States Patent

Chen et al.

[11] Patent Number: 5,850,476
[45] Date of Patent: Dec. 15, 1998

[54] AUTOMATIC METHOD OF IDENTIFYING DROP WORDS IN A DOCUMENT IMAGE WITHOUT PERFORMING CHARACTER RECOGNITION

[75] Inventors: Francine R. Chen, Menlo Park, Calif.; John W. Tukey, Princeton, N.J.

[73] Assignee: Xerox Corporation, Stamford, Conn.

[21] Appl. No.: 572,847

[22] Filed: Dec. 14, 1995

[51] Int. Cl.[6] .................................................. G06K 9/34
[52] U.S. Cl. .......................... 382/177; 382/179; 382/203
[58] Field of Search .................................. 382/177, 203, 382/173, 179, 187, 165; 395/144, 145, 146

[56] References Cited

U.S. PATENT DOCUMENTS

| | | | |
|---|---|---|---|
| 3,930,237 | 12/1975 | Villers | 707/104 |
| 4,194,221 | 3/1980 | Stoffel | 358/456 |
| 4,610,025 | 9/1986 | Blum et al. | 382/177 |
| 4,741,045 | 4/1988 | Denning | 382/178 |
| 4,907,283 | 3/1990 | Tanaka et al. | 382/229 |
| 4,965,763 | 10/1990 | Zamora | 704/1 |
| 5,077,668 | 12/1991 | Doi | 707/531 |
| 5,131,049 | 7/1992 | Bloomberg et al. | 382/257 |
| 5,181,255 | 1/1993 | Bloomberg | 382/176 |
| 5,202,933 | 4/1993 | Bloomberg | 382/176 |
| 5,257,186 | 10/1993 | Ukita et al. | 707/531 |
| 5,297,027 | 3/1994 | Morimoto et al. | 707/501 |
| 5,315,671 | 5/1994 | Higuchi | 382/309 |
| 5,321,770 | 6/1994 | Huttenlocher et al. | 382/174 |
| 5,325,444 | 6/1994 | Cass et al. | 382/177 |
| 5,384,864 | 1/1995 | Spitz | 382/177 |
| 5,390,259 | 2/1995 | Withgott et al. | 382/173 |
| 5,396,566 | 3/1995 | Bruce et al. | 382/187 |
| 5,410,611 | 4/1995 | Huttenlocher et al. | 382/177 |
| 5,410,612 | 4/1995 | Arai et al. | 382/187 |
| 5,442,715 | 8/1995 | Gaborski et al. | 382/187 |
| 5,444,797 | 8/1995 | Spitz | 382/177 |
| 5,488,719 | 1/1996 | Kaplan et al. | 382/177 |
| 5,491,760 | 2/1996 | Withgott et al. | 382/203 |
| 5,495,349 | 2/1996 | Ikeda | 358/518 |
| 5,526,443 | 6/1996 | Nakayama | 382/229 |
| 5,544,259 | 8/1996 | McCubbrey | 382/177 |
| 5,550,934 | 8/1996 | Van Vliembergen et al. | 382/229 |
| 5,638,543 | 6/1997 | Pedersen et al. | 704/1 |

FOREIGN PATENT DOCUMENTS

| | | |
|---|---|---|
| 0 544 432 A2 | 6/1993 | European Pat. Off. . |
| 06 096288 A | 4/1994 | Japan . |
| 2 218 839 | 11/1989 | United Kingdom . |

OTHER PUBLICATIONS

Bloomberg, Dan S. and Luc Vincent. "Blur Hit–Miss Transform and Its Use in Document Image Pattern Detection," *Proceedings SPIE Conference 2422, Document Recognition II*, San Jose, CA, Feb. 6–7, 1995, pp. 278–292.

Bloomberg, Dan S. et al. "Measuring Document Image Skew and Orientation," *Proceedings SPIE Conference 2422, Document Recognition II*, San Jose, CA, Feb. 6–7, 1995, pp. 302–316.

Bloomberg, Dan S. "Multiresolution Morphological Analysis of Document Images," *Proceedings SPIE Conference 1818, Visual Communications and Image Processing '92*, Boston, MA, Nov. 18–20, 1992, pp. 648–662.

(List continued on next page.)

Primary Examiner—Edward L. Coles
Assistant Examiner—Cheukfan Lee
Attorney, Agent, or Firm—Tracy L. Hurt

[57] ABSTRACT

A method of automatically identifying drop words in a document image without performing character recognition to generate an ASCII representation of the document text. First, the document image is analyzed to identify word equivalence classes, each of which represents at least one word of the multiplicity of words included in the document. Second, for each word equivalence class, the likelihood that it is not a drop word is determined. Third, document length is analyzed to determine whether the document is short. For a short document, the number of word equivalence classes identified as drop words based upon their likelihood is proportional to document length. For long documents, a fixed number of word equivalence classes are identified as drop words based upon the likelihood that they are not drop words.

11 Claims, 11 Drawing Sheets

OTHER PUBLICATIONS

Chen, Francine R. et al. "Spotting Phrases in Lines of Imaged Text," *Proceedings SPIE Conference 2422, Document Recognition II*, San Jose, CA, Feb. 6–7, 1995, pp. 256–269.

Chen, Francine R. and Margaret Withgott. "The Use of Emphasis to Automatically Summarize a Spoken Discourse," *Proceedings of the IEEE International Conference on Acoustics, Speech and Signal Processing*, vol. 1, San Francisco, CA, Mar. 23–26, 1992, pp. 229–232.

Cheong, Tong L. and Tan S. Lip. "A Statistical Approach to Automatic Text Extraction," Institute of Systems Science; Asian Library Journal, pp. 1–8.

Jones, Karen S. and Brigitte Endres–Niggemeyer. "Automatic Summarizing," Information Procesing & Management, vol. 31, No. 5, pp. 625–630, 1995

Jones, Karen S. "What Might Be in a Summary?," Information Retreiveal 93: Von der Modellierung zur Anwendung' (ed. Knorz, Krause and Womser–Hacker), Universitatsverlag Konstanz, 1993, 9–26.

Jones, Richard L. "AIDA the Artificially Intelligent Document Analyzer," McDonald, C., Weckert, J. ed.,. *Proceedings of a Conference and Workshop on Libraries and Expert Systems*, Riverina, Austrailia, Jul. 1990, pp. 49–57.

Jones, Richard L. and Dan Corbett. "Automatic Document Content Analysis: The AIDA Project," Library Hi Tech, vol. 10:1–2(1992), issue 37–38, pp. 111–117.

Kupiec, Julian et al. "A Trainable Document Summarizer," *Proceedings of the 18th Annual International ACM SIGIR Conference on Research and Development in Information Retrieval*, Seattle, WA, Jul. 9–13, 1995, pp. 68–73.

Luhn, H. P. "The Automatic Creation of Literature Abstracts," IBM Journal of Research and Development, vol. 2: No. 2, Apr., 1958, pp. 159–165.

Luhn, H. P. "A Business Intelligence System," IBM Journal of Research and Development, vol. 2: No. 4,. Oct. 1958, pp. 314–319.

Paice, Chris D. "Constructing Literature Abstracts by Computer: Techniques and Prospects," Information Processing & Management, vol. 26, No. 1, pp. 171–186, 1990.

Paice, Chris D.and Paul A. Jones. "The Identification of Important Concepts in Highly Structured Technical Papers," *Proceedings of the Sixteenth Annual International ACM SIGIR Conference on Research and Development in Information Retrieval*, Pittburgh, PA, Jun. 27–Jul. 1, 1993, pp. 69–78.

Rath, G. J. et al. "The Formation of Abstracts by the Selection of Sentences: Part I. Sentence Selection by Men and Machines," American Documentation, Apr., 1961, pp. 139–143.

Salton, Gerard et al. "Automatic Analysis, Theme Genreation, and Summarization of Machine–Readable Texts," Science, vol. 264, Jun. 3, 1994, pp. 1421–1426.

AUTOMATIC METHOD OF IDENTIFYING DROP WORDS IN A DOCUMENT IMAGE WITHOUT PERFORMING CHARACTER RECOGNITION

FIELD OF THE INVENTION

The present invention relates to a method of automatic text processing. In particular, the present invention relates to a method of identifying drop words a document image without performing character recognition.

BACKGROUND OF THE INVENTION

Document summaries and abstracts serve a valuable function by reducing the time required to review documents. Summaries and abstracts can be generated after document creation either manually or automatically. Manual summaries and abstracts can be of high quality but may be expensive because of the human labor required. Alternately, summaries and abstracts can be generated automatically. Automatic summaries and abstracts can be cheaper to produce, but obtaining high quality consistently is difficult.

Systems for generating automatic summaries rely upon one of two computational techniques for analyzing ASCII documents, natural language processing or quantitative content analysis. Natural language processing is computationally intensive. Additionally, producing semantically correct summaries and abstracts is difficult using natural language processing when document content is not limited.

Quantitative content analysis relies upon statistical properties of text to produce summaries. Gerald Salton discusses the use of quantitative content analysis to summarize documents in "Automatic Text Processing" (1989). The Salton summarizer first isolates text words within a corpus of documents. Next, the Salton summarizer flags as title words used in titles, figures, captions, and footnotes. Afterward, the frequency of occurrence of the remaining text words within the document corpus is determined. The frequency of occurrence and the location of text words are then used to generate word weights. The Salton summarizer uses the word weights to score each sentence of each document in the document corpus. These sentence scores are used in turn to produce a summary of a predetermined length for each document in the document corpus. Summaries produced by the Salton summarizer may not accurately reflect the themes of individual documents because word weights are determined based upon their occurrence across the document corpus, rather than within each individual document.

Although many documents are available in ASCII, many others are available only as paper documents. Paper documents can be converted to ASCII text by performing optical character recognition (OCR), which then permits use of automatic summarization techniques. However, OCR systems are not perfect and require significantly more processing time than is required to perform document summarization or abstraction.

SUMMARY OF THE INVENTION

An object of the present invention is to enable automatic generation of a document summary from a document image without first performing character recognition.

A technique for automatically identifying drop words in a document image without performing OCR or types of character recognition will be described. First, the document image is analyzed to identify word equivalence classes, each of which represents at least one word of the multiplicity of words included in the document. Second, for each word equivalence class, the likelihood that the word equivalence class is not a drop word is determined. Third, document length is analyzed to determine whether the document is short. For a short document, the number of word equivalence classes identified as drop words based upon their likelihood is proportional to document length. For long documents, a fixed number of word equivalence classes are identified as drop words based upon the likelihood that they are not drop words.

Other objects, features, and advantages of the present invention will be apparent from the accompanying drawings and detailed description that follows.

BRIEF DESCRIPTION OF THE DRAWINGS

The present invention is illustrated by way of example and not by way of limitation in the figures of the accompanying drawings. In the accompanying drawings similar references indicate similar elements.

DETAILED DESCRIPTION OF THE PREFERRED EMBODIMENTS

Figure 1:
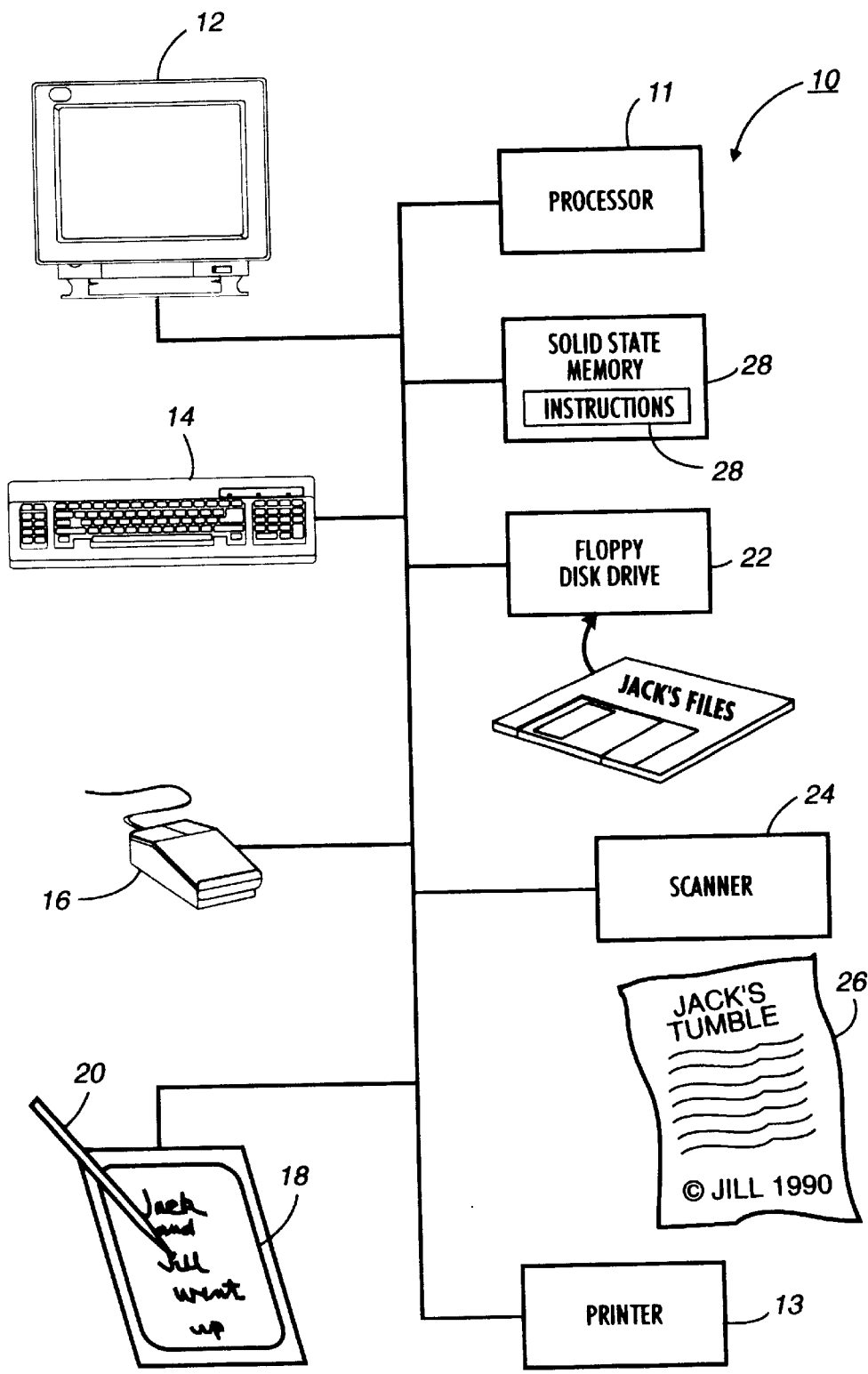
FIG. 1 illustrates a computer system for automatically generating thematic summaries of documents.

FIG. 1 illustrates in block diagram form computer system 10 in which the present method is implemented by executing instructions 44. Instructions 44 alter the operation of computer system 10, allowing it to identify drop words in a document image, without performing optical character recognition first to obtain an ASCII representation of the document, which enables efforts to generate a thematic summary for a document from its image without performing character recognition. Briefly described, according to instructions 44 computer system 10 first analyzes the document to identify word equivalence classes, each of which represents at least one word of the multiplicity of words included in the document. Next, computer system 10 determines for each word equivalence class the likelihood that it is not a drop word. Afterward, computer system 10 evaluates the length of the document to determine whether the document is short or long. For a short document, the number of word equivalence classes identified as drop words based upon their likelihood is proportional to document length. For long documents, a fixed number of word equivalence classes are identified as drop words based upon the likelihood that they are not drop words.

A. A Computer System for Generating Thematic Summaries from a Document Image

Prior to a more detailed discussion of the present method, consider computer system 10. Computer system 10 includes monitor 12 for visually displaying information to a computer user. Computer system 10 also outputs information to the computer user via printer 13. Computer system 10 provides the computer user multiple avenues to input data. Keyboard 14 allows the computer user to input data to computer system 10 by typing. By moving mouse 16 the computer user is able to move a pointer displayed on monitor 12. The computer user may also input information to computer system 10 by writing on electronic tablet 18 with a stylus or pen. Alternately, the computer user can input data stored on a magnetic medium, such as a floppy disk, by inserting the disk into floppy disk drive 22. Scanner 24 permits the computer user to input an electronic, binary, representation of hard copy of the image of document 26. Computer system 10 uses the document images generated by scanner 24 to generate thematic summaries without first performing OCR and without an ASCII representation of the document. Thus, the present method enables generation of quick summaries without incurring the computational expense of character recognition techniques.

Processor 11 controls and coordinates the operations of computer system 10 to execute the commands of the computer user. Processor 11 determines and takes the appropriate action in response to each user command by executing instructions stored electronically in memory, either memory 28 or on a floppy disk within disk drive 22. Typically, operating instructions for processor 11 are stored in solid state memory 28, allowing frequent and rapid access to the instructions. Semiconductor logic devices that can be used to realize memory 28 include read only memories (ROM), random access memories (RAM), dynamic random access memories (DRAM), programmable read only memories (PROM), erasable programmable read only memories (EPROM), and electrically erasable programmable read only memories (EEPROM), such as flash memories.

Figure 2:
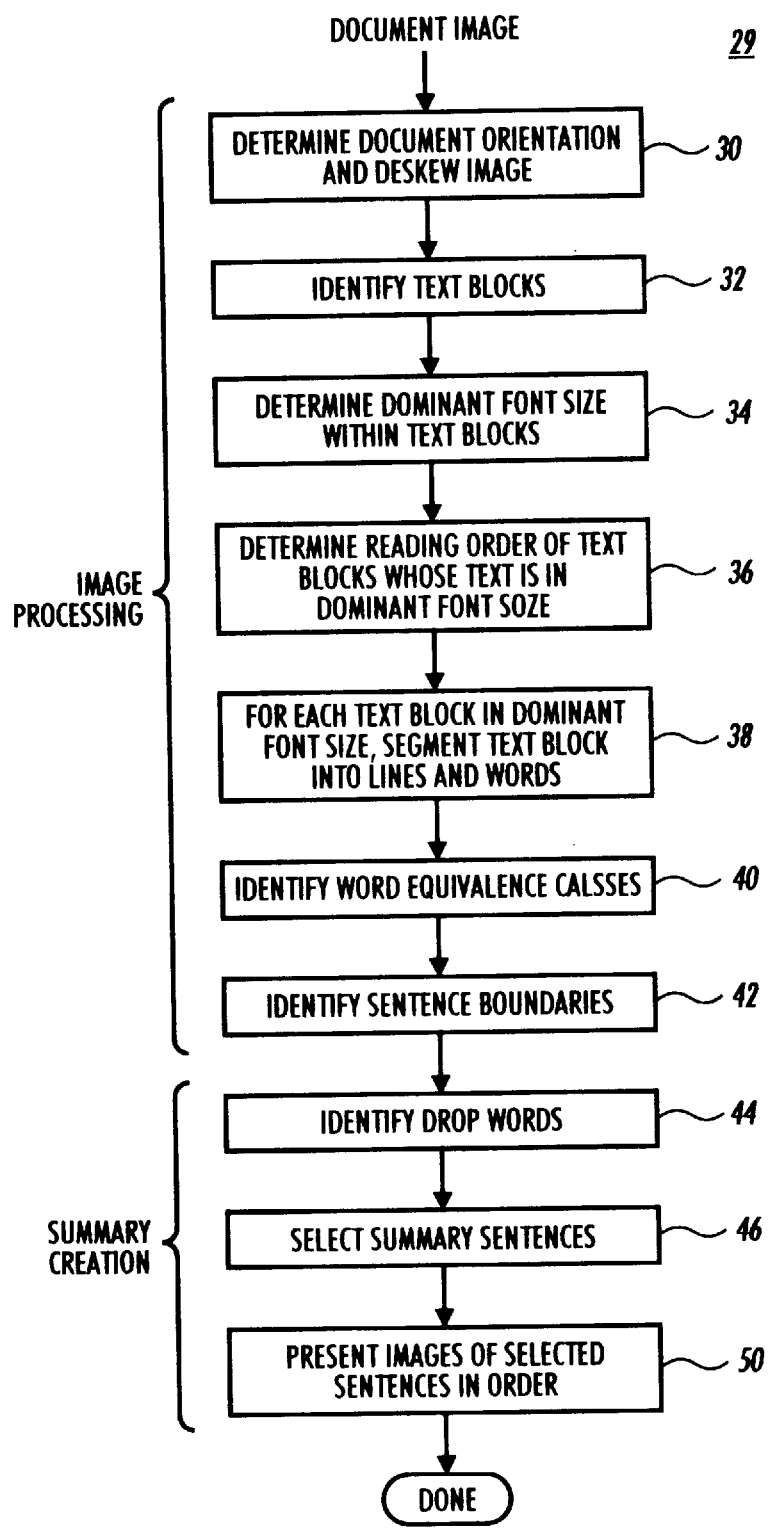
FIG. 2 is a flow diagram of a method of generating a thematic summary of a document from its image without performing character recognition.

B. Overview of the Method of Generating a Thematic Summary from a Document Image FIG. 2 illustrates in flow diagram form instructions 29 for generating a thematic summary of a document from its image without first obtaining an ASCII representation of the document text. Instructions 29, as well as all other instructions discussed herein, may be stored in solid state memory 28 or on a floppy disk placed within floppy disk drive 22. Instructions 29, as well as all other instructions discussed herein, may be realized in any computer language, including LISP and C++.

Briefly described, computer system 10 begins by analyzing the document image during steps 30, 32, 34, 36, 38, 40, and 42 to extract layout and logical information from the page images. Layout information describes the manner in which specific components of the document, such as blocks of text and individual words, are spatially organized within the image. Logical information describes, or labels, the components of the document. Logical information important to text summarization includes identification of the main body of text, the reading order of text blocks within the main body, word equivalence classes, and identification of sentence boundaries. Computer system 10 uses the layout and logical information obtained during image processing to create the summary during steps 44, 46, 48 and 50. Computer system 10 uses the word equivalence classes and their bounding boxes to identify and eliminate drop words. Subsequently, computer system 10 uses this reduced set of word equivalence classes to select thematic words. Afterward, these thematic words are used in conjunction with the identified sentence boundaries to select thematic sentences. Knowledge of the reading order is used to present the thematic sentences in the order in which they are presented in the document.

1. Determining Orientation and Skew

Given that brief description, consider now in detail instructions 29. Receipt of the page images of a document from scanner 24 and a request for a thematic summary initiates execution of instructions 29 by processor 11. During step 30 processor 11 prepares for later image processing by performing two tasks. First, processor 11 assumes that the text of the document image has a single orientation and then determines that orientation using known methods, such as that described by Bloomberg, Kopec and Dasari, in "Measuring document image skew and orientation," *SPIE Conf. 2422, Document Recognition II*, San Jose, Calif., Feb. 6–7, 1995, pp. 278–292. If processor 11 finds no significant orientation, then the document image probably includes very little text, which can either be analyzed as is, or skipped. Afterward, processor 11 performs the second task of step 30 by removing skew in the document image. This simplifies later segmentation analysis and improves subsequent baseline analysis. Processor 11 determines the skew angle to within about 0.1 degrees using techniques discussed in "Measuring document image skew and orientation," ibid, and then rotates the document image using two or three orthogonal shears. Having removed the skew, processor 11 exits step 30 and advances to step 32.

2. Text Block Segmentation

With step 32 processor 11 begins its top-down segmentation of the document image by identifying text blocks within the document image. Processor 11 performs this task in three stages. First, processor 11 removes all halftones and other "images" in the document image. Second, processor 11 identifies the text blocks within the document image. Third, and finally, processor 11 removes any remaining line art components.

The preferred method of removing halftones and "image" parts is described by D. S. Bloomberg in "Multiresolution morphological analysis of document images," SPIE Conf. 1818, *Visual Communications and Image Processing '92*, Boston, Mass., Nov. 18–20, 1992, pp. 648–662. The preferred method includes three steps. First, processor 11 forms a seed image containing pixels exclusively from the halftone parts of the document image. Second, processor 11 forms a mask image covering all image pixels, a mask whose connectivity is sufficient to join any halftone seed with other pixels covering that halftone region. Third, and finally, processor 11 performs binary reconstruction, filling, from the seed into the mask, thereby creating a halftone "mask." Processor 11 then uses that mask to remove the "image" parts from the document image, leaving only the text and line-art in the resulting document image.

Having removed halftones and image parts, processor 11 then turns to identification of text blocks during step 32, taking care not to join text blocks in adjacent columns. Processor 11 does so at a resolution of about 75 pixels/inch (ppi). Processor 11 begins by making a mask of the vertical white space in the document image. This mask is made by inverting the document image and then opening it with a large vertical structuring element. Processor 11 then closes the text blocks using moderated sized horizontal and vertical structuring elements, to form a single connected component from each text block. Afterward, processor 11 subtracts the white space mask to insure that adjacent text blocks are separated.

That done, processor 11 turns to the last task of step 32, removing connected components generated by the previous task that do not represent text blocks. For example, various line art components may have survived the removal of halftones and "image" parts. Processor 11 uses two techniques to eliminate these components. Some components, like horizontal rules, can be identified by their very small height. Identification of components with more elaborate line graphics requires using another technique. These components can be identified by their lack of the internal text line structure characteristically found in text blocks. Processor 11 distinguishes valid text blocks from these components by joining the characters in the image underlying a block in the horizontal direction to solidify any text lines that may exist. Processor 11 then statistically analyzes the resulting "text line" components to determine their mean width and mean height, or alternatively their median width and median height. Processor 11 labels as text blocks those blocks whose "text line" components have sufficiently large height-to-width ratios and have mean width that is a significant fraction of the putative text block's width. Processor 11 thereafter ignores all other blocks with "text line" components whose height-to-width ratios are insufficient or whose mean width are insufficient. Having identified all blocks of text, processor 11 branches from step 32 to step 34.

3. Dominant Font Size and Reading Order

During step 34 processor 11 identifies the main body of text within the text blocks identified during step 32. It is from the main body of the text that processor 11 will later select thematic sentences for the summary. Typically, within a document the main body of text is printed in the same font, called the dominant font, while headings and captions may appear in a variety of font sizes. Processor 11 distinguishes the main body of text from other types of text for two reasons. First, because of the difference in size and font between the dominant font and non-dominant fonts it is not possible using word equivalence classes to directly identify the same word in two different fonts. Second, blocks of non-dominant font when interspersed with blocks of the dominant font can make it difficult to identify the reading order of the text blocks, which in turn can cause errors in identifying sentence boundaries. Thus, processor 11 divides the text blocks into two classes based upon median font sizes. (Recall that processor 11 determined the median font size for each block during step 32.) These classes are:

1. Conforming: Text blocks whose text font size is close to the median size for the document; and
2. Non-conforming: Text blocks whose text font is significantly larger or smaller than the median font size for the document. Preferably, processor 11 classifies a block as non-conforming if its median height varies more than 15% from the median text height for the document.

How processor 11 identifies conforming text blocks will be described in greater detail below with respect to FIG. 3. After identifying the conforming text blocks, processor 11 advances to step 36 from step 34.

Processor 11 takes the conforming text blocks during step 36 and determines their reading order. Processor 11 makes this determination based solely on layout information contained in the document image. Because of this the correct reading order cannot always be found; however, good results can be obtained using a hierarchical top-to-bottom decomposition and by distinguishing between regions that have vertical overlap, horizontal overlap, or no overlap.

Processor 11 begins the top-to-bottom decomposition by identifying those sets of blocks whose vertical coordinates overlap each other. In other words, processor 11 begins by identifying sets of related conforming text blocks. Processor 11 does so using a horizontal projection profile for the rectangular bounding boxes of the conforming text blocks. These projection profiles are then treated as a set of run-lengths on a line, and the set of conforming text blocks associated with each run-length is easily determined from its projection profile. Processor 11 orders the sets so found from top to bottom for reading purposes.

Having grouped the conforming text blocks into sets, processor 11 next determines the reading order of blocks within each of those sets. Processor 11 begins by selecting a pair of blocks within a set of conforming text blocks. Typically, the two blocks do not overlap each other. For these cases there are three possible relationships between the two blocks:

1. One block is above the other, with horizontal overlap between the two blocks.
2. One block is to the left of the other, with vertical overlap between the two blocks.
3. There is neither vertical overlap, nor horizontal overlap, between the two blocks.

Processor 11 determines the relative reading order of the pair of text blocks based upon which relationship they fit. If the pair of blocks overlap with each other, then processor 11 uses different ordering rules depending upon which of two possible relationships the blocks fit:

1. Upper left corner of one overlapping block above that of the other block. In this case, the higher block will be read before the lower block.
2. Upper left corner of one overlapping block same height as that of the other block, and to the left of the other block. Here, the leftmost block will be read before the block to the right of it.

These ordering rules, and those discussed for non-overlapping blocks, are not transitive. That is to say, reading order determined by these rules depends in theory upon the order of comparisons; however, the arrangement of text blocks within a page is usually very simple so that the ordering rules used during step 36 are usually practically transitive. In other words, the order in which comparisons are made during step 36 usually is not important. The way in which processor 11 determines the reading order of pairs of text blocks within a set of conforming text blocks will be discussed in more detail later with respect to FIG. 4. Having determined the reading order of the conforming text blocks, processor exits step 36 and advances to step 38.

4. Text Line and Word Line Segmentation

Processor 11 segments the conforming text blocks into text lines and words during step 38. Processor 11 locates text lines using operations similar to those for finding font size, which were discussed previously with respect to step 34. Within each conforming text block, at a resolution of about 150 ppi for text set in 6–18 point, processor 11 uses a morphological closing operation with a horizontal structuring element large enough to connect all parts of each text line into a single connected component. Processor 11 distinguishes connected components that do not represent lines of text from connected components for true text lines by size, and removes the false text lines from further consideration. Afterward, the bounding boxes for the connected components of the true text lines are found.

Given the bounding boxes for true text lines, processor 11 then attempts to find the words within those text lines by finding the bounding boxes for the connected components within each text line. To do so processor 11 uses a technique similar to that used to construct the bounding boxes for text lines. Processor 11 first uses a small horizontal closing, at 150 ppi a 4 pixel structure is best, to join most of the characters in each word. Next, processor 11 finds word bounding boxes for the connected components just found. Afterward, processor 11 sorts these word bounding boxes into a list horizontally within each text line. Processor 11 joins most of the words not joined by the previous operation by performing a merge operation on their word bounding boxes. In doing so, processor 11 scales the maximum horizontal gap to be close to the height of the text lines. Preferably, processor 11 does the final merge on the bounding boxes because the merging distance between characters is often smaller using bounding boxes than morphologically closing on the bit map. As a result of the methods used during step 38, punctuation is not always connected to words, so processor 11 removes these smaller components from the ordered word list. That done, processor 11 exits step 38 and branches to step 40.

5. Identifying Word Equivalence Classes

Having identified the word images within the main body of text, processor 11 can now turn its attention to identifying which word images correspond to the same word without using OCR, during step 40. Processor 11 places all words sufficiently similarly shaped in the same word equivalence class. In doing so, processor 11 must use matching parameters that are neither too strict, nor too permissive. Using overly strict matching parameters poses the danger of placing two images of the same word in different word equivalence classes. If overly permissive matching parameters are used processor 11 faces the danger of placing different words in the same word equivalence class. Fortunately, identification of word equivalence classes can be performed with few errors over a large range of matching parameters and the performance of instructions 29 is not seriously degraded by a small number of errors.

Preferably during step 40 processor 11 identifies word equivalence classes using a modification of either the blur hit-miss transform (BHMT) or Hausdorff transforms. BHMT is described in D. S. Bloomberg and L. Vincent, "Blur Hit-Miss transform and its use in document image pattern detection," *SPIE Conf.* 2422, *Document Recognition II*, San Jose, Calif., Feb. 6–7, 1995, pp. 278–292 and the Hausdorff transforms are described in G. Matheron, "Random Sets and Integral Geometry," Academic Press, 1975. During step 40 processor 11 modifies the containment constraint of the selected transform to allow some outlying pixels to be included in the image foreground; i.e., to permit some fraction of pixels to be outside the matching set. For images relatively free of pepper noise, and with some tolerance for pixel outliers, the rank BHMT and a rank version of the Hausdorff transform are essentially equivalent.

During step 40, based upon expected type size of 6–18 point, processor 11 works at a resolution of 150 ppi using a blur size of 2, and a tolerance for pixel outliers that is a fraction of the number of pixels in the word image. Preferably, that fraction is about 2 percent. Processor 11 only tests one instance of alignment between the template and word image bounding boxes—that instance is the coincidence of the upper left corners of the template and word image bounding boxes.

Processor 11 identifies the word equivalence classes during step 40 using a single pass. Processor 11 analyzes each word image of the conforming blocks to find the best match with the representative of an existing word equivalence class. If processor 11 finds a match then the word image is added to the list of instances for that word equivalence class; otherwise, processor 11 forms a new word equivalence class with that word image as its representative.

Preferably, during step 40 processor 11 associates with the word equivalence list a number of pieces of information that will be useful later during steps 44 and 46. For each word equivalence class these pieces of information include a sentence I.D. for each sentence in which the word equivalence class appears, the width of the word in pixels, as well as the number of times the word appears as the first non-short word of a sentence. As used herein, a word is regarded as the first non-short word of a sentence if it is the first word in the sentence with a width greater than a predetermined value, which is chosen to eliminate some short articles and prepositions from consideration. Afterward, processor 11 advances to step 42 from step 40.

6. Labeling Sentence Boundaries

During step 42 processor 11 identifies and labels sentence boundaries within the blocks of conforming text, thereby enabling later selection of thematic sentences. Processor 11 identifies sentences by searching for periods near the baselines of text lines and then finding the words most closely associated with those periods. Doing so requires considerably more time than required to execute the previous steps because the connected component analysis must be done at a resolution of approximately 300 ppi for usual font sizes, 6–18 point. For example, when computer system 10 is a 60 MHz Sun Sparcstation 20, labeling the sentences of a typical page takes about 2 seconds. To identify periods ending a sentence processor 11 must distinguish between periods and pepper noise near the baseline, commas and semicolons, the dots of an ellipsis, the lower dot in a colon, and the dot that ends an intra-sentence abbreviation. Additionally, processor 11 must identify dots that are part of an exclamation mark or question mark. To improve the perceived performance of the thematic summarizer, during step 42 processor 11 should also identify quotes following a period that end a sentence. Processor 11 distinguishes between periods and the other types of punctuation based upon measured distances. Consequently, it is important to use a scale for comparisons that is based upon the size of the font being examined and that is independent of the resolution at which the document image is scanned. Preferably, the scale used is the measured median height of the bounding boxes for the connected components of the characters in the text block. Typically, this is the "x-height" of the dominant font. How processor 11 makes these distinctions during step 42 will be discussed in detail below with respect to FIG. 5. Having labeled sentence boundaries within the blocks of conforming text, processor 11 exits step 42 and branches to step 44.

7. Identifying Drop Words

With entry to step 44 processor 11 is ready to take the information generated during previous image processing and begin identifying sentences to be extracted for the thematic summary. Processor 11 starts by identifying drop words. As used herein, "drop words" are words that do not convey thematic meaning and occur very frequently in natural language text. Most pronouns, prepositions, determiners, and "to be" verbs are classified as drop words.

Thus, for example, words such as "and, a, the, on, by, about, he, she" are drop words.

A number of factors must be considered in determining the likelihood that a word is a drop word. Drop words tend to occur very frequently in a document, but then so do many other words indicative of topical content. Consequently, frequency alone cannot be used to identify drop words. Many drop words tend to be short, but so are many words indicative of topical content. Thus, the width of a word equivalence class alone is not sufficient to identify drop words. Many drop words tend to occur at the beginning of a sentence and so do many topical content words. Given these facts, processor 11 determines the likelihood that a word is not a drop word based upon a combination of factors, which include the word's width in pixels, its number of occurrences within the document, and the number of times it occurs as the first "wide" word in a sentence. How processor 11 identifies drop words using these factors will be described in more detail below with respect to FIG. 11.

Processor 11 then eliminates from the list of word equivalence classes those classes least likely not to be drop words. How many classes are eliminated as drop words depends upon the length of the document being processed. Afterward, processor 11 branches to step 46 from step 44.

8. Selecting Thematic Sentences

Processor 11 uses the reduced word list generated during step 44 to identify thematic words. Having eliminated the words most likely to be drop words, processor regards the most frequent of the remaining words as likely to be indicative of document content, so they are called thematic words. Processor 11 then uses the thematic words to score each sentence in the blocks of conforming text. After scoring each sentence, processor 11 selects for extraction the highest scoring sentences. How processor 11 identifies the thematic words and selects sentences for extraction will be described in detail below with respect to FIG. 12.

Processor 11 advances to step 50 from step 46. Having selected the sentences to be extracted, processor 11 presents them to the computer user in the order in which they appear in the document being summarized. These sentences may be presented on monitor 12, printer 13 or stored in memory, either solid state memory 28 or on a floppy disk in disk drive 22.

C. Identifying Text Blocks in the Dominant Font

Figure 3:
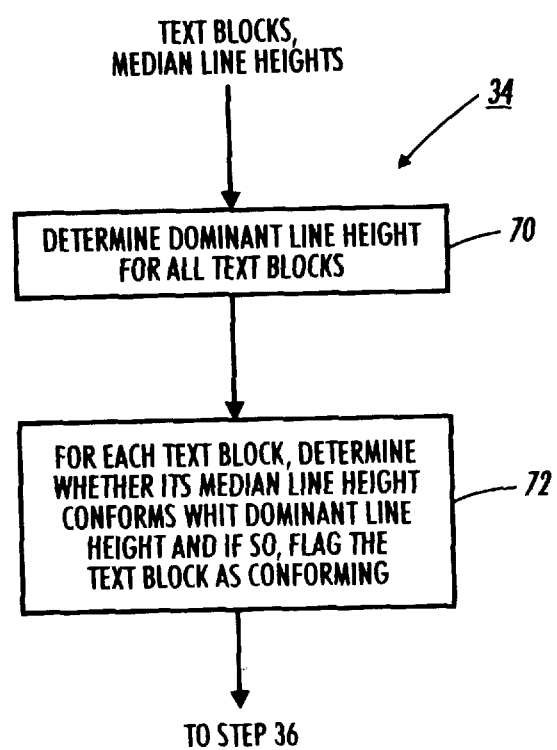
FIG. 3 is a flow diagram of a method of identifying the dominant font size in a document image.

FIG. 3 illustrates in flow diagram form instructions 34 for identifying the blocks of the main body of text. Processor 11 begins its efforts to identify the main body of text by determining the dominant font size during step 70. Processor 11 is able to make this determination with relative ease because the median line height of each block of text was determined earlier during step 32. Processor 11 uses these block median line heights to find the median line height for the entire document; i.e., the dominant font size. Processor 11 then branches to step 72 from step 70.

Processor 11 identifies and flags text blocks in the dominant font size during step 72. Any block of text whose median font size differs from the dominant font size by no more than a maximum percentage is flagged as a conforming text block. In one embodiment, the maximum percentage difference in font size tolerated by processor 11 is 15%.

D. Determining the Reading Order of Conforming Text Blocks

Figure 4A:
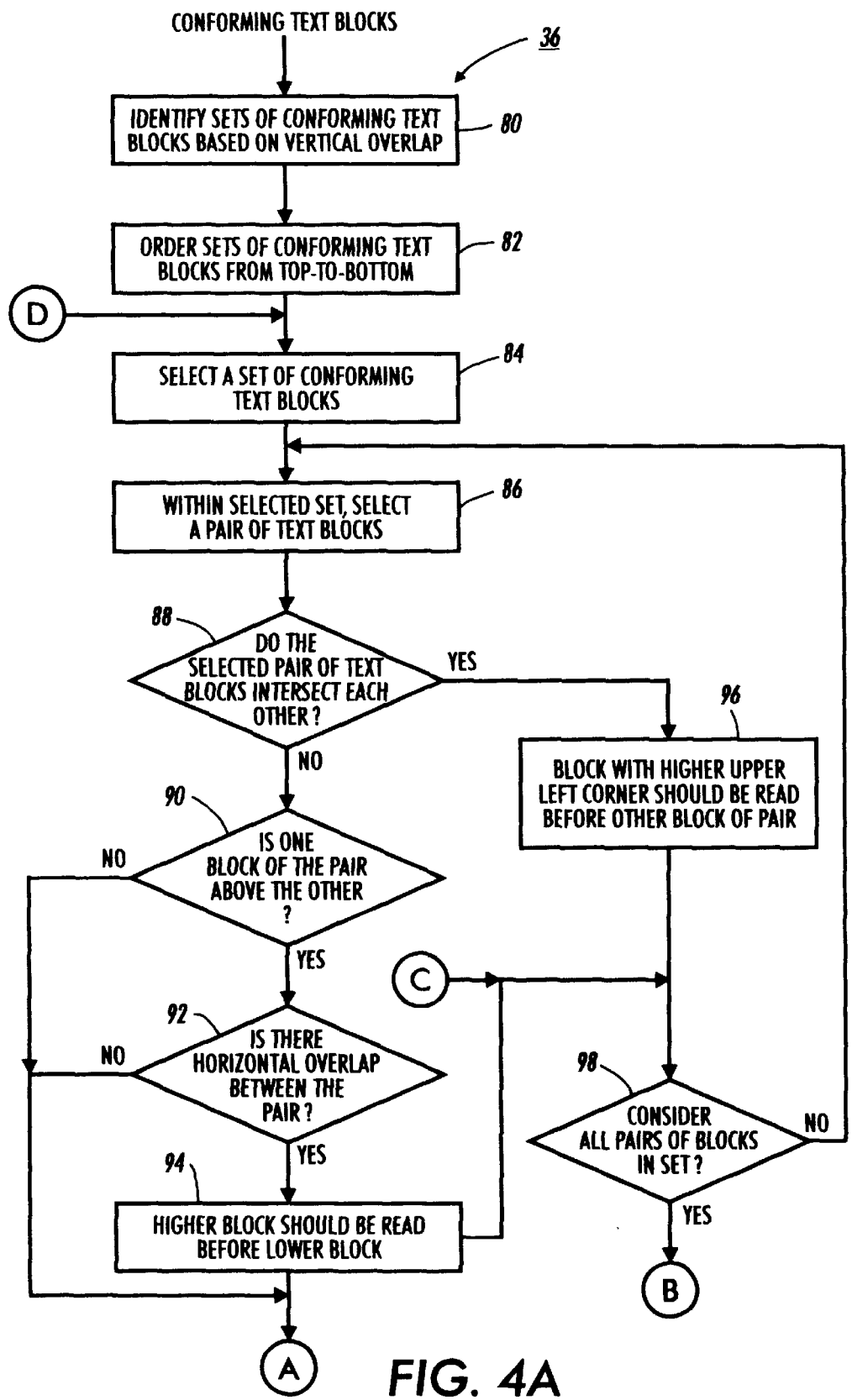
FIG. 4 is a flow diagram of a method of determining the reading order of blocks of text in a document image.
Figure 4B:
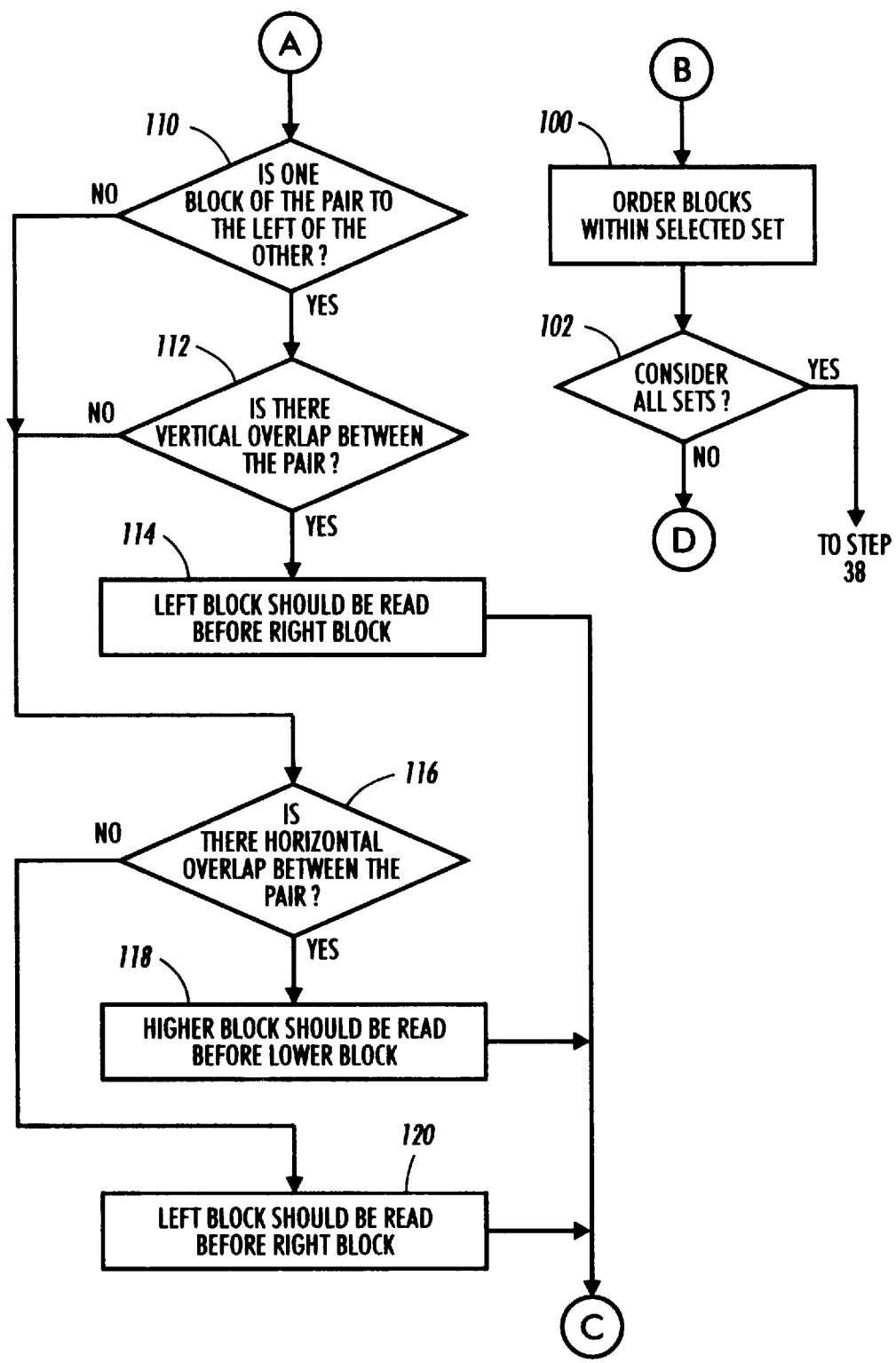

FIG. 4 illustrates in flow diagram form instructions 36 for determining the reading order of conforming text blocks. Briefly described, instructions 36 break this task into several parts. First, processor 11 organizes the conforming text blocks into sets and orders those sets from top to bottom.

Second, processor 11 determines the relative reading order among each pair of blocks in each set of blocks. Processor 11 makes its determination based upon the relative position of the two blocks, specifically, whether the two blocks intersect each other, overlap each other horizontally or vertically, and their relative position otherwise. Using this information, processor 11 decides whether the leftmost or uppermost block should be read first.

Given that brief description, now consider instructions 36 in detail. Processor 11 begins by identifying sets of conforming text blocks based upon vertical coordinate overlap between the blocks. Processor 11 can make this determination by finding the horizontal projection profile for the bounding boxes of conforming text blocks. Each projection profile is treated as a set of run-lengths on a line, allowing processor 11 to easily identify those blocks whose vertical coordinates overlap. That done, processor 11 exits step 80 and branches to step 82 to order the sets of conforming text blocks from top to bottom. In other words, text within higher sets of blocks is to be read before text within lower sets of blocks. Processor 11 then advances to step 84.

Processor 11 begins the process of determining the reading order of the blocks within each of set of conforming text blocks during step 84. First, processor 11 selects a set of blocks to work with. Next, during step 86 processor 11 selects a pair of blocks within the selected set of blocks. That done, processor 11 advances to step 88.

Processor 11 determines which of two sets of ordering rules to use during step 88 by determining whether the selected pair of text blocks intersect each other. Processor 11 makes this determination using the coordinates of the bounding boxes for the selected pair of text blocks. If the two blocks do intersect one another, then processor 11 indicates during step 96 that the block to be read first of the pair is the block whose bounding box has the highest upper left corner. That done, processor 11 advances to step 98. Discussion of events during step 98 will be briefly deferred.

Processor 11 branches to step 90 from step 88 when the selected pair of blocks do not intersect each other. With step 90 processor 11 begins its efforts to determine the relative position on the page image of the selected pair of text blocks with respect to each other. Processor 11 begins by determining whether one block of the pair is above the other on the page. If one block is above the other, processor 11 exits step 90 and advances to step 92. During step 92 processor 11 determines whether there is an overlap in the horizontal projection profiles of the selected pair of text blocks. Should the horizontal coordinates of the selected pair of blocks overlap processor 11 advances to step 94. At this point, processor 11 indicates that the higher block of the pair should be read before the lower block. That done, processor 11 branches to step 98. Discussion of events during step 98 will be briefly deferred.

If processor 11 fails to find the desired relative position between the selected pair of blocks during steps 90 and 92, then processor 11 branches to step 110. During steps 110 and 112 processor 11 again examines the relative position of the selected pair of blocks, searching for coincidence with another pattern. First, during step 110 processor 11 determines whether one block of the pair is to the left of the other block. If so, processor 11 branches to step 112, where it is determined whether the vertical coordinates of the pair of blocks overlap. If their vertical coordinates do overlap, then the pair of blocks coincides with the pattern being tested for, and processor 11 advances to step 114 where processor 11 indicates that the block furthest to the left should be read before the other block of the pair. That done, processor 11 again advances to step 98.

If the desired relative position between the pair of blocks is not discovered during steps 110 and 112, processor 11 advances to step 116. Processor 11 first determines whether the horizontal coordinates of the pair blocks overlap. If they do, during step 118 processor 11 indicates that the higher block of the pair should be read before the lower. On the other hand, if the horizontal coordinates do not overlap, then during step 120 processor 11 indicates that the leftmost block of the pair should be read before the other block. Processor 11 then advances to step 98.

Processor 11 reaches step 98 when it has indicated the relative reading order between the selected pair of blocks. During step 98 processor 11 discovers whether another pair of blocks within the selected set must be examined or not. If all pairs of blocks within the selected set of blocks have not been considered, processor 11 exits step 98, returns to step 86 to select another pair of blocks within the selected set and to order them as discussed previously. On the other hand, if all pairs of blocks within the selected set of blocks have been ordered, then processor 11 advances to step 100. At this point processor 11 determines whether other sets of blocks require ordering. If so, processor 11 returns to step 84 from step 100 and selects another set of blocks, which it will order in the manner previously described. On the other hand, if processor 11 has already determined the relative reading order for all blocks in all of the sets, then processor 11 advances to step 102. Processor 11 determines the reading order within each block of each set during step 102 based upon their relative reading order. That done, processor 11 exits step 102 and advances to step 38.

E. Labeling Sentence Boundaries

Figure 5:
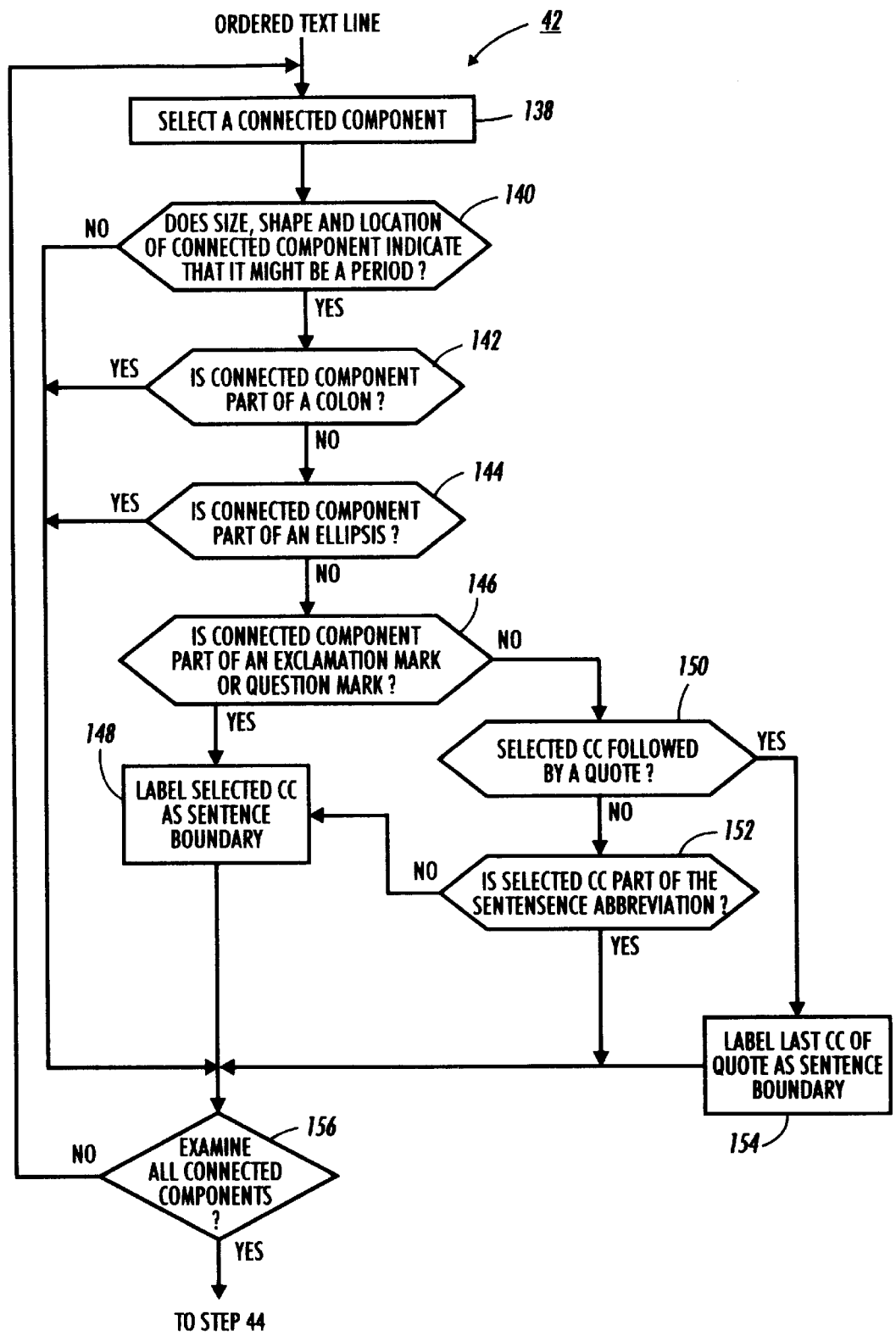
FIG. 5 is a flow diagram of a method of identifying sentence boundaries within a document from its image.

FIG. 5 is an overview of instructions 42 executed by processor 11 to identify sentence boundaries within blocks of conforming text. Processor 11 does so by searching for connected components of the true text lines near the baseline that might be periods and then determining whether these period shaped connected components end a sentence. Processor 11 makes these determinations based upon the position of the selected connected component with respect to neighboring connected components within the selected text line.

Processor 11 begins execution of instructions 42, after an ordered text line has been selected for examination, by selecting a connected component during step 138. Subsequently, during step 140, processor 11 determines whether the selected connected component might be a period. That is to say, processor 11 determines whether the size, shape, and location of the selected connected component is consistent with its being a period. How processor 11 makes those determinations will be discussed in detail with respect to FIG. 6. If these characteristics indicate that the selected connected component might be a period, processor 11 advances to step 142.

With step 142 processor 11 begins a multi-step process to discover whether the selected connected component may not be a period even if it is dot shaped and close to the baseline. To do so, processor eliminates two possibilities: 1) that the selected connected component is part of a colon; and 2) that the selected connected component is part of a string of dots. Processor 11 first tests whether the selected connected component might be part of a colon by determining the relative position of the selected connected component relative to its neighbors. How processor 11 makes the determination of whether the selected connected component is a colon will be described in detail later with respect to FIG. 7. If the relative position of the selected connected component and its neighbors indicates that the selected connected component is not part of a colon, then the selected component might be part of punctuation that marks a sentence boundary. To further investigate that possibility, processor 11 advances to step 144 from step 142.

During step 144 processor 11 decides whether the selected connected component is part of an ellipsis by comparing the relative position between the selected connected component and its following neighbor, as discussed in detail below with respect to FIG. 7. If not part of an ellipsis, the selected connected component may mark the end of a sentence. To analyze further that possibility, processor 11 exits step 144 and branches to step 146.

Processor 11 determines during step 146 whether the selected connected component is part of an exclamation mark or question mark, as described below with respect to FIG. 8. If so, then the selected connected component is part of punctuation ending a sentence. Accordingly, processor 11 advances to step 148 and marks the selected connected component as sentence boundary.

Even if the selected connected component is not part of an exclamation mark or question mark, it may still mark the end of a sentence. In response to this situation processor 11 exits step 146 and branches to step 150. Processor 11 determines during step 150 whether the selected connected component is followed by a quote using the method discussed with respect to FIG. 9. If the selected connect component is followed by a quote, then the selected component is the ending punctuation of a sentence, but does not mark the sentence boundary. Thus, during step 154 processor 11 marks as the sentence boundary the quote following the selected component.

The selected connected component may still be a period ending a sentence even if it fails the test of step 150. To disprove that possibility, if possible, processor 11 determines during step 152 whether the selected connected component is part of an intra-sentence abbreviation. How processor 11 makes that determination will be described in detail with respect to FIG. 10. Should processor 11 discover that the selected connected component is not part of an intra-sentence abbreviation, then processor 11 considers the selected connected component to be a period marking a sentence boundary. Thus, during step 148 processor 11 so marks the selected connected component.

Processor 11 advances to step 156 after failing one of the tests of steps 140, 142, or 144, or after having labeled a sentence boundary. Thus, during step 156 processor 11 determines whether any other connected components remain to be examined. If so, processor 11 returns to step 138 and executes instructions 42 until all connected components have been examined. Having labeled all sentence boundaries, processor 11 then branches from step 156 to step 44.

1. Identifying a Connected Component that Might Be a Period

Figure 6:
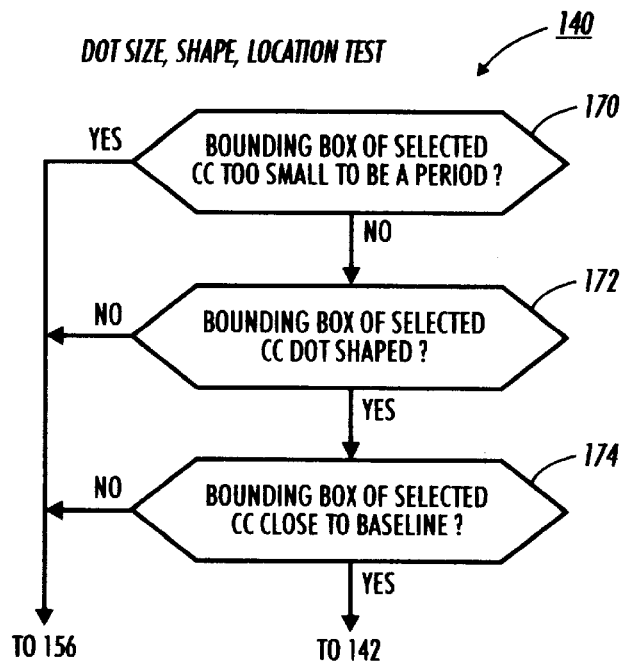
FIG. 6 is a flow diagram of a method of determining whether a connected component might be a period.

FIG. 6 illustrates in flow diagram form instructions 140 executed by processor 11 to determine whether the selected connected component might be a period. Processor 11 performs three different test to reach its decision.

First, during step 170 processor 11 determines whether the selected connected component might be pepper noise. Processor 11 reaches a decision on this point based upon the size of the bounding box for the selected connected component. If the size of the bounding box exceeds a minimum size, then the selected connected component may be a period. Setting the minimum bounding box size to about one tenth of the median x-height of the text line works well. Preferably, the minimum bounding box size is 3 pixels wide by 3 pixels long. If the selected connected component exceeds the minimum size, processor 11 exits step 170 and advances to step 172.

Processor 11 performs a second test to determine whether the selected connected component might be a period during step 172. Processor 11 determines whether the selected component is shaped like a dot by examining two characteristics. The first characteristic considered is the size of each dimension of the bounding box of the selected connected component. Each dimension must be smaller than a first fraction of the x-height. Preferably, each dimension is less than 40% of the x-height. The second characteristic considered by processor 11 is the difference in size between the two dimensions of the bounding box of the selected connected component. The difference between the two dimensions must be less than a second fraction of the median x-height. Preferably, the second fraction is set equal to 12% of the median x-height. If the bounding box of the selected connected component possesses both of the required characteristics, then the selected connected component is unlikely to be a comma, or the lower connected component of a semi-colon, and may be a period. To further investigate that possibility, processor 11 branches to step 174 from step 172.

During step 174 processor 11 performs its third test to determine whether the selected connected component might be a period. Processor 11 now examines the position of the selected connected component to see if it's located near the baseline of the text line. Because there may be some small error in the earlier baseline measurements, processor 11 treats the selected connected component as on the baseline if within some number of pixels from the baseline. Preferably, the selected connected component is treated as being on the baseline if it is within 2 pixels of the baseline. If the selected connected component is close enough to the baseline, then processor 11 exits step 174, headed to step 142.

Should processor 11 find that the selected connected component fails to posses any of the required characteristics, then processor 11 returns to step 156.

2. Determining Whether a Connected Component is a Colon

Figure 7:
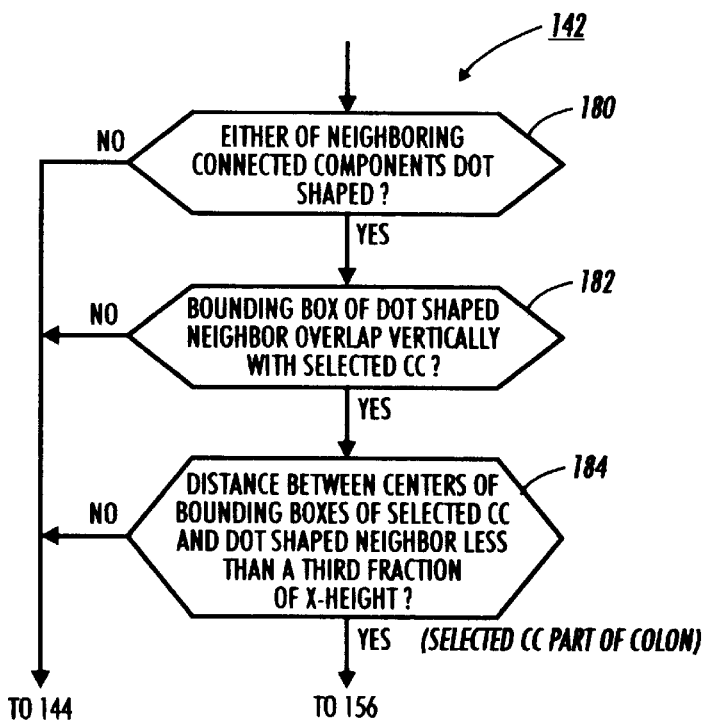
FIG. 7 illustrates a flow diagram for a method of determining whether a connected component is part of a colon.

FIG. 7 illustrates in flow diagram form instructions 142 executed by processor 11 to determine whether the selected connected component is a colon. Processor 11 considers relationships between the selected connected component and its neighbors to make this determination.

Processor 11 begins its efforts with step 180, during which it examines the shape of both of the connected components neighboring the selected connected component. If neither of these is dot shaped, as determined by applying the same test used during step 172, then processor 11 has eliminated the possibility that the selected connected component is part of a colon. In that case, processor 11 advances to step 144. On the other hand, if either of the neighboring connected components are dot shaped, the selected connected component may be a colon. Processor 11 responds to that possibility by advancing to step 182 from step 180.

During step 182 processor 11 determines whether the selected connected component and its dot shaped neighbor are positioned like the dots of a colon, one above the other. If these two connected components do represent a colon, then their bounding boxes will be vertically aligned and horizontally overlap each other by some amount. How much overlap is not important. No overlap between the two bounding boxes indicates that the selected connected component is not part of a colon, causing processor 11 to branch to step 144 from step 182. Overlap between the bounding box of the selected connected component and its dot shaped neighbor indicates that the selected connected component might be part of a colon. In this case, processor 11 advances to step 184.

Processor 11 perform its last test to determine whether the selected connected component is part of a colon during step 184. Processor 11 examines the distance between the tops of the bounding boxes of the two relevant connected components to eliminate the possibility that the neighboring connected component is actually part of a different text line than the selected connected component. That is the most likely case when the distance between the tops of the two bounding boxes exceeds a third fraction of the x-height, which is preferably set to 1. If the distance exceeds this fraction, then the selected connected component is not part of a colon, and may mark a sentence boundary. Processor 11 advances to step 144 from step 184 to further investigate that possibility. On the other hand, if the distance between the tops of the two bounding boxes is less than that third fraction, then the selected connected component is likely a colon and fails to mark a sentence boundary. In that case, processor 11 returns to step 156.

3. Determining Whether a Connected Component is Part of an Ellipsis

Figure 8:
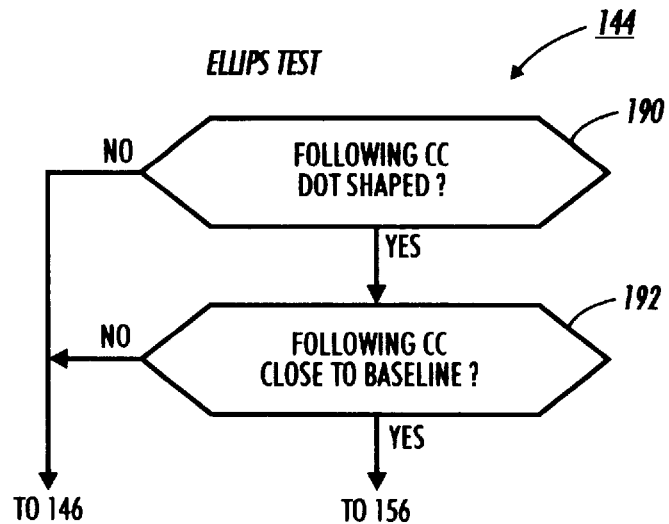
FIG. 8 illustrates a flow diagram for a method of determining whether a connected component is part of an ellipsis.

FIG. 8 illustrates in flow diagram form instructions 144 executed by processor 11 to determine whether the selected connected component is part of an ellipsis.

Processor 11 begins in step 190 by determining whether the connected component following the selected connected component is also dot shaped. Processor 11 does so using the method discussed with respect to step 172. If the following connected component is not dot shaped, then the selected connected component may not be part of an ellipsis, or may be the last dot of an ellipsis. This is an ambiguous situation, to which there are two possible responses. First, always do the same thing whenever an ellipsis is found: always end the sentence or never end the sentence. Second, analyze the connected components following the selected connected component to see if they begin a new sentence. This is the approach taken by instructions 144. If the selected connected component might be the last dot of an ellipsis, processor 11 advances to step 146 to continue searching for other clues as to whether the selected component marks a sentence boundary.

Processor 11 advances to step 192 from step 190 when the selected connected component might be part of an ellipsis because the following connected component is dot shaped. During step 192 processor 11 examines how close to the baseline the following connected component is. If the test discussed previously with respect to step 174 indicates that following connected component is close enough to the baseline, then processor 11 considers the selected component to be part of an ellipsis. Accordingly, processor 11 advances to step 156. On the other hand, if the following connected component isn't close enough to the baseline, the selected component is not treated as part of an ellipsis, and may mark a sentence boundary. In response, processor 11 exits step 192 and branches to step 146.

4. Determining Whether a Connected Component is Followed by Quotes

Figure 9:
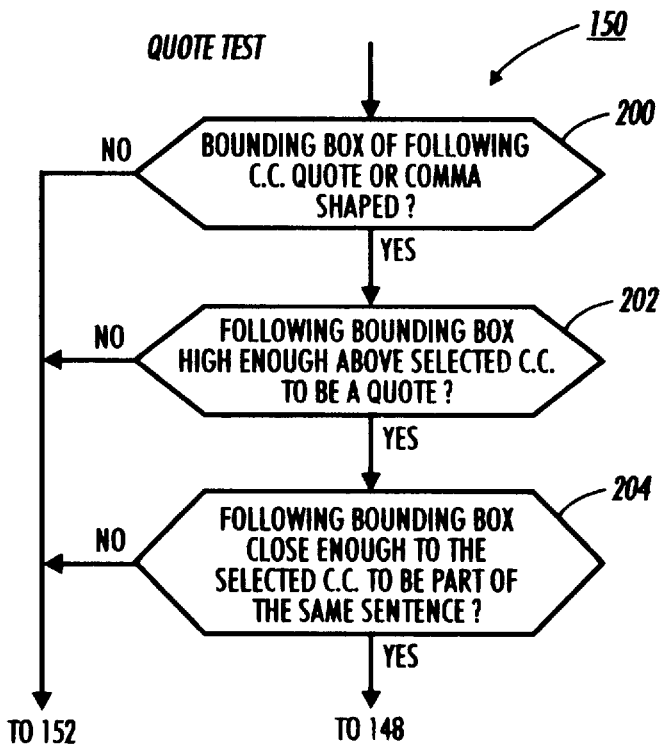
FIG. 9 illustrates a flow diagram for a method of determining whether a connected component is followed by a quote.

FIG. 9 illustrates in flow diagram form instructions 150 executed by processor 11 to determine whether the selected connected component is followed by one or two quotes. This permits labeling the quote as the sentence boundary and ensures that if the associated sentence is extracted as a thematic sentence, that the image presented will include both opening and closing quotation marks.

During step 200 processor 11 determines whether the following two connected components are shaped like a quote. Processor 11 considers the following two connected components to be quote shaped if they satisfy three conditions. First, the width of the bounding boxes of each of the quote shaped connected components must be less than a sixth fraction of the x-height. Preferably, the sixth fraction is set equal to 0.4. Second, the height of the bounding boxes of each of the quote shaped following connected components must be less than a seventh fraction of the x-height, which is preferably set to 0.8. Third, the difference between the height and width of the bounding box of each quote shaped following connected component must be less than an eighth fraction of the x-height. This fraction is preferably set to 0.15. If neither of the two following connected components satisfies all three of these constraints, quotes do not follow the selected connected component and processor 11 advances to step 152. On the other hand, if one or both of the following connected component satisfies all three constraints, processor 11 proceeds to step 154.

Processor 11 examines the position of the bounding box of the following connected component relative to that of the selected connected component during step 202. Is the following connected component high enough above the selected connected component to be a quote? Processor answers that question using a fourth fraction of the x-height, which is preferably set to 0.5. If the following connected component is not high enough above the top of the selected connected component, then a quote does not follow the selected connected component. Processor 11 responds by advancing to step 152. If processor 11 finds the opposite, that the top of the bounding box of the following connected component is at least the fourth fraction above the top of the bounding box of the selected component, then processor 11 branches from step 202 to step 204.

During step 204 processor 11 applies one last test to determine whether either of the two following connected components is a quote. Even though one or both of the following connected components is quote shaped and located far enough above the selected connected component, the following connected components still may not be a quote unless it is close enough horizontally to the selected connected component. Processor 11 makes this determination by measuring the distance horizontally between the left sides of both connected components. This distance must be less than a fifth fraction of the x-height, which is preferably set to 1.3. If the two connected components are not close enough, processor 11 exits step 204 and advances to step 152. On the other hand, if the following connected component follows closely enough the selected connected component to be a quote, processor 11 proceeds to step 148 from step 204.

Figure 10:
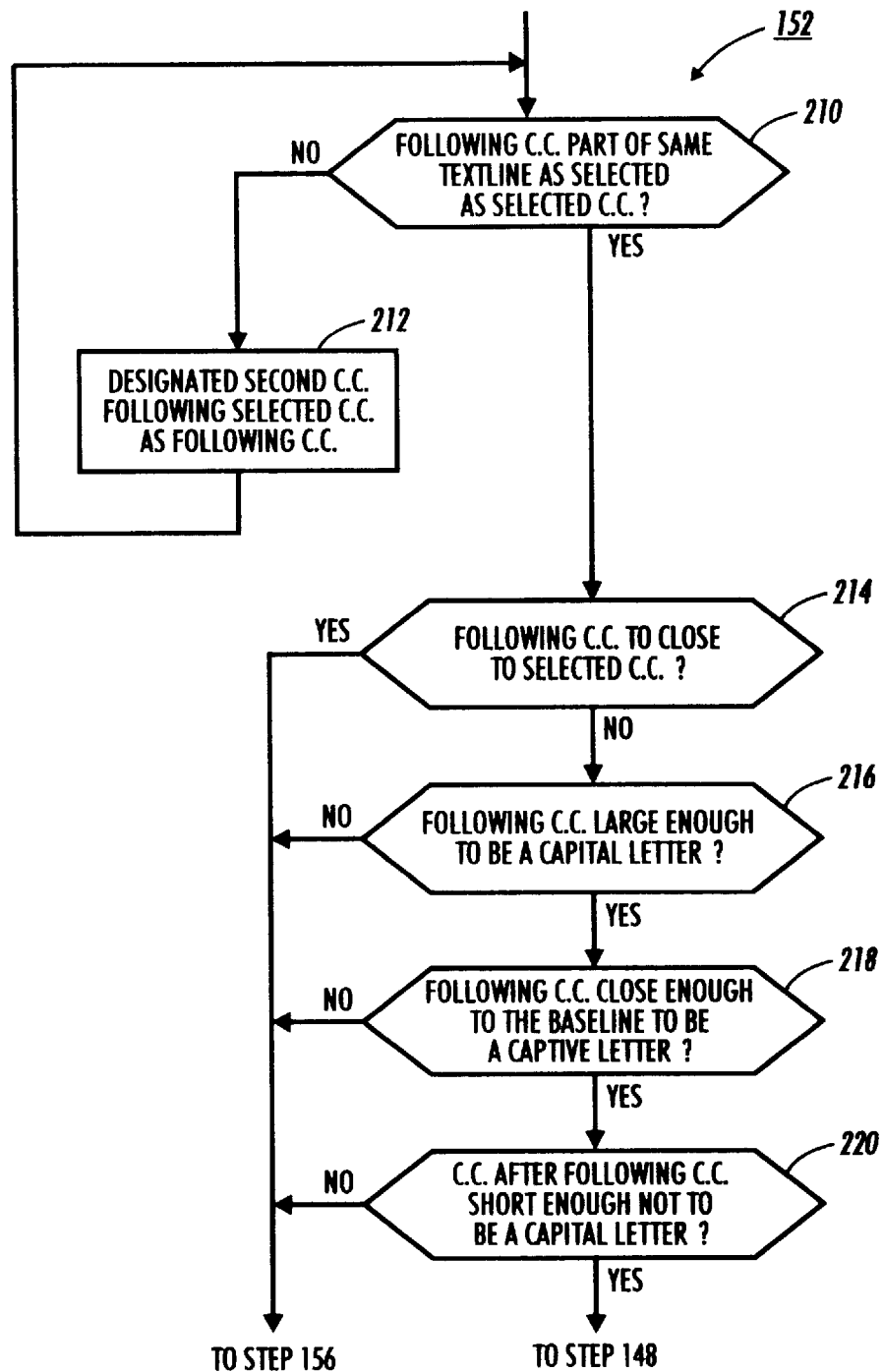
FIG. 10 is a flow diagram of a method of determining whether a connected component is an intra-sentence abbreviation.

5. Determining Whether a Connected Component is Part of an Intra-sentence Abbreviation FIG. 10 illustrates in flow diagram form instructions 152 executed by processor 11 to determine whether the selected connected component is part of an intra-sentence abbreviation. The selected connected component is unlikely to be part of an intra-sentence abbreviation if the relative position of the following connected component is correct with respect to the selected connected component and the following connected component is a capital letter. Should the following connected component fail to satisfy either of these requirements, then the selected connected component is considered part of an intra-sentence abbreviation and does not mark a sentence boundary.

With step 210 processor 11 begins efforts to determine whether the position of the following connected component with respect to the selected connected component is consistent with it ending a sentence. First, during step 210 processor 11 determines whether the following connected component is part of the same text line as the selected connected component. Processor 11 does so to eliminate the possibility that a connected component associated with a line below that of the selected connected component was captured as part of the text line bounding box because of very small vertical separation between adjacent text lines. To make this decision, processor 11 measures the vertical distance between the tops of the bounding boxes for the selected and following connected components. If the vertical distance between the two connected components exceeds a ninth fraction of the x-height, then the two connected components do not belong to the same text-line. Preferably, the ninth fraction is set equal to 0.2.

Upon discovery that the two connected components do not belong to the same text line, processor 11 branches to step 212 from step 210. Processor 11 then designates the neighbor to the right of the following connected component as the new following connected component. Processor 11 then returns to step 210 to renew its efforts to determine whether the selected connected component is a period or part of an intra-sentence abbreviation.

Eventually, processor 11 may find a connected component following the selected connected component included in the same text line as the selected connected component before reaching the end of that text line. If that occurs, processor 11 branches to step 214 from step 210. Processor 11 now begins efforts to determine whether the relative positions of the selected and following connected components are consistent with the following connected component being a capital letter beginning another sentence. During step 214 processor 11 determines whether the following connected component is located far enough to the left of the selected connected component. The following connected component is considered far enough away if the left edge of its bounding box is a tenth fraction of the x-height away from the left edge of the bounding box for the selected connected component. Preferably, the tenth fraction is set equal to 0.4. This fraction of the x-height is sufficient so that very few true periods are eliminated as part of an intra-sentence abbreviation. If the two connected components are not far enough apart from each other, processor 11 regards the selected connected component as part of an intra-sentence abbreviation and branches to step 156 from step 214. On the other hand, if the distance between the two connected components is great enough, the following connected component may be the start of another sentence. Processor 11 branches to step 216 to consider further that possibility.

During step 216 processor 11 determines whether the size of the following connected component is great enough for it to be a capital letter. Processor 11 makes this decision by comparing the height of the bounding box of the following connected component to an eleventh fraction of the x-height. Preferably, the eleventh fraction is set equal to 1.25. If that height does not exceed the eleventh fraction, processor 11 does not treat the following connected component as a capital letter, nor the selected connected component as a period ending a sentence. Instead, processor 11 branches to step 156 from step 216. On the other hand, if the height of following connected component exceeds the eleventh fraction, then the following connected component may be a capital letter. Processor 11 responds to this possibility by exiting step 216 and branching to step 218.

Processor 11 continues to test the hypothesis that the following connected component is a capital letter starting a new sentence during step 218. Processor 11 does so by examining how close the following connected component is to the baseline. Capital letters rest on the baseline, so the bottom of the following connected component should be close to the baseline if it is a capital letter. Processor 11 considers the following connected component to be close to the baseline if the distance between the baseline and the bottom of the bounding box of the following connected component does not exceed a few pixels. Should the bottom of the following connected component be too far from the baseline, processor 11 branches to step 156 and treats the selected connected component as part of an intra-sentence abbreviation. Conversely, if the bottom of the following connected component is close enough to the baseline, the following connected component may be a capital letter and may start a new sentence. Processor 11 responds to this situation by advancing to step 220.

Processor 11 performs one last test during step 220 to determine whether the following connected component may be the start of a new sentence. During step 220 processor 11 compares the height of the following connected component to that of its neighbor to the right. Call this connected component the right neighbor. If the height of the right neighbor is too great as compared to that of the following connected component, then the following connected component probably does not start a new sentence because few letters are much greater in height than a capital letter. Processor 11 makes this determination by comparing the difference in the height of the two connected components to a twelfth fraction of the x-height, which is preferably set equal to 0.2. Should the height of the right neighbor exceed that of the following connected component by more than the twelfth fraction, then processor 11 branches to step 156 and treats the selected connected component as part of an intra-sentence abbreviation. Conversely, should the difference in height between the two connected components be less than the twelfth fraction, then processor 11 treats the selected connected component as a period ending a sentence and branches to step 148 from step 220.

F. Identifying and Eliminating Drop Words

Figure 11:
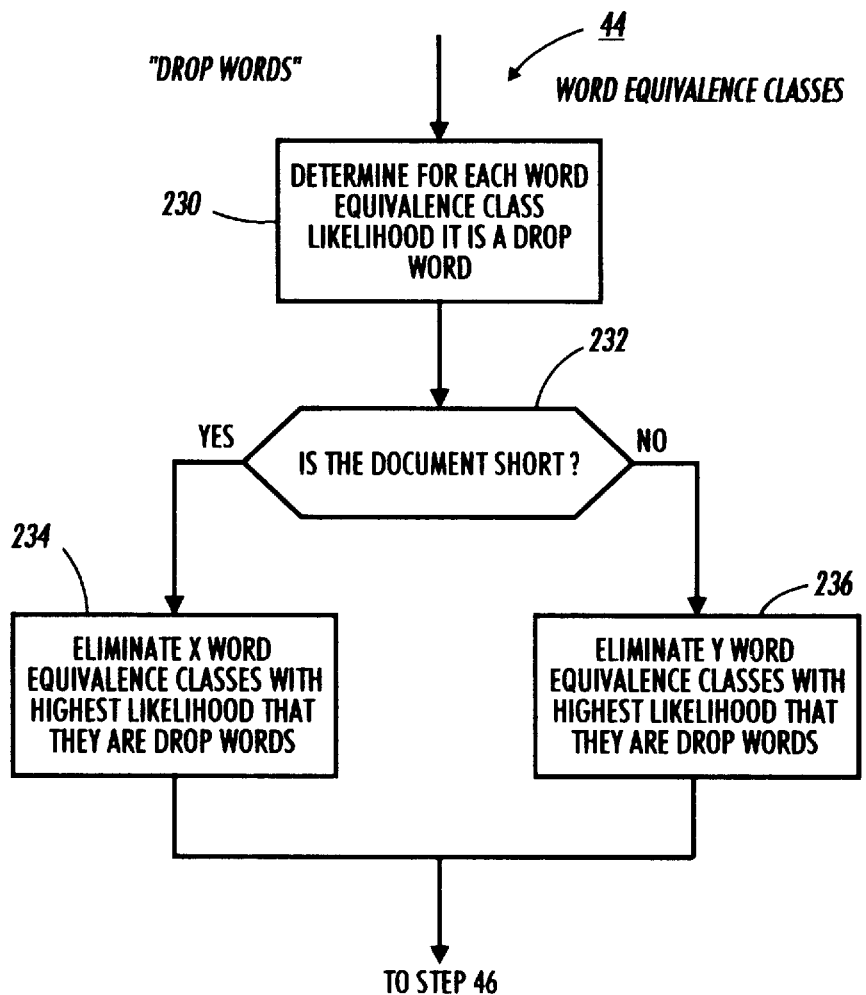
FIG. 11 is a flow diagram of a method of identifying drop words from a document image.

FIG. 11 illustrates in flow diagram form instructions 44 executed by processor 11 to identify and eliminate drop words from the word list. Execution of instructions 44 begins with step 230 after receipt of the word list and the related information generated during step 42.

Processor 11 begins by calculating for each word the likelihood that it is not a drop word. A number of factors are used to determine that likelihood: the width of the word in pixels, the number of occurrences of the word within conforming text blocks, the total number of words in the document, and the number of time the word occurs as the first non-short word in a sentence. As used herein, a non-short word is any word that is enough larger than a selected short word, such as "the."

Typically, "the" is the most frequently occurring word in a document, so that processor 11 can usually identify it form among the word equivalence classes. To identify the word equivalence class representing "the", processor 11 first orders the word equivalence classes according to frequency. To ensure that it has located "the", processor 11 compares the width of the most frequent word equivalence class to that of the narrowest, frequent word equivalence class. Processor 11 identifies the narrowest frequent word by searching the 20–50 most frequent word equivalence classes. Processor 11 assumes that it has identified "the" if the width of the most frequent word equivalence class is at least four times that of the narrowest, frequent word equivalence class. If processor 11 has identified "the", then it is used as the selected short word. On the other hand, if processor 11 has not identified "the", then the narrowest, frequent word equivalence class is used as the selected short word.

How much wider than the selected short word a word equivalence class must be to qualify as a non-short word is a design choice. In one embodiment, when the selected short word is "the", non-short words are 1.2 times the width of the selected short word. When the selected short word is the narrowest, frequent word equivalence class then non-short words should be a number of items wider than the selected short word; e.g. 5×.

After identifying the first non-short word in each sentence, processor 11 calculates indicator of the likelihood that each word is not a drop word. Preferably, processor 11 calculates that indicator of the likelihood according to the formula:

$$L=(\omega_i/\omega_{the})*(1+b_i/f_i)+(c*W/f_i)$$

where:

$L$ is the indicator of the likelihood a word is not a drop word;

$\omega_i$ is the width of the word i in pixels;

$\omega_{the}$ is the width of the word "the" in pixels;

$b_i$ is the number of times the word i occurs as the first non-short word of a sentence in one of the conforming text blocks;

$f_i$ is the number of occurrences of the word i in the conforming text blocks;

c is a constant weighting factor between the two terms, preferably with a value of approximately 0.0004; and W is the total number of words in the document.

The first term of the equation, $(\omega_i/\omega_{the})*(1+b_i/f_i)$, favors longer words that tend to appear at the beginning of a sentence as content words. The second term, $(c*W/f_i)$, favors words which tend to occur relatively infrequently as content words.

Having determined the indicator of that likelihood that each word equivalence class is not a drop word, processor 11 orders the word equivalence classes according to the likelihood that they are not drop words. This order is then reversed to generate an ordering of word equivalence classes according to the likelihood that they are drop words.

Processor 11 advances to step 232 from step 230 and decides whether the document is short or long. This is done simply by comparing the total number of word equivalence classes to some threshold value. If the document is a short one, processor 11 branches to step 234 and eliminates as drop words the X words with the highest likelihood that they are drop words, where X is proportional to the document length. For example, X may be weakly monotonically increasing with document length. On the other hand, if the document is a long one, processor 11 advances to step 236 from step 232. In this case, processor 11 eliminates as drop words the Y words with the highest likelihood that they are drop words, where Y is a constant number.

Alternatively, steps 232, 234, and 236 may be replaced with a single step. In this embodiment, Z is the number of word equivalence classes identified as drop words. The magnitude of Z may be chosen based upon an analysis of any number of factors. For example, Z may be chosen based upon the characterization of a set of features describing a window of word equivalence classes. These features may be simple, such as the average width of the word equivalence classes or frequency of the word equivalence classes within the window. In the preferred embodiment, Z is chosen based upon the width of an ordering of the word equivalence classes according to their likelihood that they are drop words. Z is chosen to ensure substantially constant width of the ordered word equivalence classes within a sliding window of some number of classes, N, where N is a design choice.

In yet another embodiment, steps 232, 234, and 236 also may be replaced with a single step. In this embodiment, word equivalence classes are identified as drop words using a threshold value of the likelihood. Any word equivalence class having a likelihood of being a drop word greater than the threshold value would be identified and eliminated as a drop word.

With drop words eliminated from the word list, processor 11 advances to step 46 to select sentences for extraction.

G. Selecting Thematic Sentences

Figure 12:
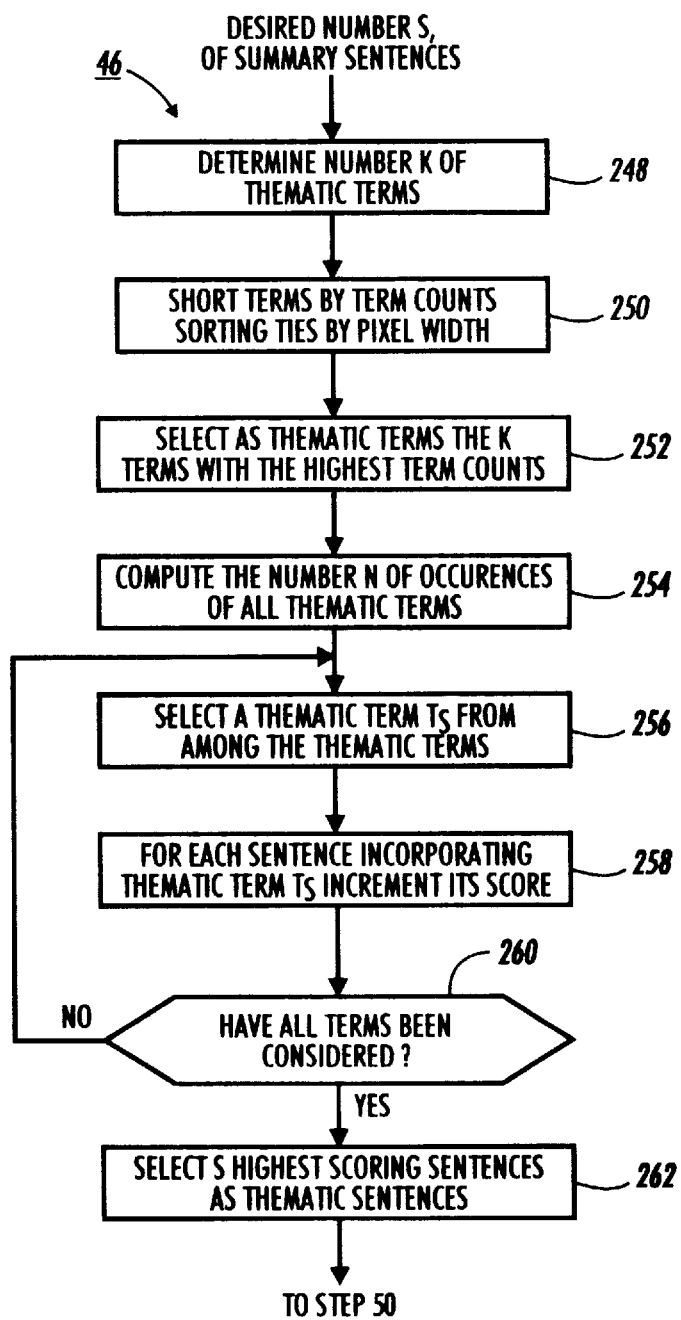
FIG. 12 is a flow diagram of a method of generating a thematic summary of a document from its image.

FIG. 12 illustrates in flow diagram form instructions 46 executed by processor 11 to select thematic sentences for extraction. Processor 11 preferably begins by offering the computer user the opportunity to change the length, denoted "S", of the thematic summary from the default length. The default length of the thematic summary may be set to any arbitrary number of sentences less than the number of sentences in the document. In an embodiment intended for document browsing, the default length of the thematic summary is set to five sentences.

Given the length of the thematic summary, processor 11 decides during step 248 the number of thematic words to be used in selecting thematic sentences. The number of thematic words is denoted "K". In general, K should be less than S and greater than 1. Requiring K be less than S insures some commonality of theme between selected thematic sentences. Preferably, K is determined according to the equation:

$$K = S \times c_1 \; S \times c_1 > 3$$

3 otherwise;
where:
$c_1$ is a constant whose value is less than 1;
S is the number of sentences in the thematic summary; and
K is the number of thematic words.

In one embodiment, the value of $c_1$ is set equal to 0.7.

Armed with a value for K, processor 11 begins the process of selecting K thematic words. During step 250 processor 11 analyzes the word list to determine the number of times each word equivalence class occurs in the document. This is done simply by counting the number of sentence I.D.s associated with each word. Afterward, processor 11 sorts the words according to their counts; i.e., the total number of occurrences of each word equivalence class in the document. Ties between two words having the same count are broken in favor of the word image with the greatest width. Afterward, processor 11 exits step 250 and advances to step 252. Processor 11 then selects from the sorted word list the K words with the highest counts. That done, processor 11 advances to step 254.

During step 254 processor 11 computes the total number of occurrences of the K thematic words in the document. That number, denoted "N", is calculated by summing the counts of the K thematic words. Processor 11 branches to step 256 from step 254.

Having selected the thematic words and determined their counts, processor 11 is ready to begin evaluating the thematic content of the sentences of the document. During steps 256, 258, 260, and 262, processor 11 considers only those sentences that include at least one of the K thematic words. Processor 11 does so by examining the K highest scoring words of the sorted word list. After selecting a word, denoted $t_s$, during step 256, processor 11 examines each sentence I.D. associated with the selected word, $t_s$, during step 258. For each sentence I.D. associated with $t_s$ processor 11 increments that sentence's score. Preferably, the score for each sentence is incremented by s, where s is expressed by the equation:

$$s = countt_s[c_2 + freqt_s];$$

where:
countts is the number of occurrences of $t_s$ in the sentence
$c_2$ is a constant having a non-zero, positive value; and
$freqt_s$ is the frequency of the selected word $t_s$.
$freqt_s$ is given by the expression:

$$freqt_s = countt_s/N;$$

where:
N represents the total number of occurrences of thematic words within the document.

Preferably, $c_2$ is set to a value of one.

Sentence scores can be tracked by generating a sentence score list during step 258. Each time processor 11 selects a sentence I.D. the sentence score list is examined to see if it includes that sentence I.D. If not, the sentence I.D. is added to the sentence score list and its score is increased as appropriate. On the other hand, if the sentence score list already includes the particular sentence I.D., then the score already associated with the sentence is incremented in the manner discussed previously.

After incrementing the scores of all sentences associated with the selected word, $t_s$, processor 11 branches from step 258 to step 260. During step 260 processor 11 determines whether all the thematic words have been evaluated. If not, processor 11 returns to step 256 to select another thematic word as the selected word. Processor 11 branches through steps 256, 258, and 260 as described previously until all of the thematic words have been examined. When that event occurs, processor 11 branches to step 262 from step 260.

During step 262 processor 11 selects as the thematic summary the S sentences with the highest scores. Processor 11 does this by sorting the sentence score list by score. Having selected the thematic sentences, processor 11 may present the thematic summary to the user via monitor 12 or printer 13, as well as storing the thematic summary in memory 22 or to floppy disk for later use. The sentences of the thematic summary are preferably presented in their order of occurrence within the document. While the sentences may be presented in paragraph form, presentation of each sentence individually is preferable because the sentences may not logically form a paragraph. Generation of the thematic summary complete, processor 11 branches to step 264 from step 262.

H. Conclusion

Thus, a method of automatically identifying drop words in a document image without performing OCR has been described. First, the document image is analyzed to identify word equivalence classes, each of which represents at least one word of the multiplicity of words included in the document. Second, for each word equivalence class the likelihood that it is not a drop word is determined. Third, document length is analyzed to determine whether the document is short. For a short document, the number of word equivalence classes identified as drop words based upon their likelihood is proportional to document length. For long documents, a fixed number of word equivalence classes are identified as drop words based upon the likelihood that they are not drop words.

In the foregoing specification, the invention has been described with reference to specific exemplary embodiments thereof. It will, however, be evident that various modifications and changes may be made thereto without departing from the broader spirit and scope of the invention as set forth in the appended claims. Accordingly, the specification and drawings are to be regarded in an illustrative rather than a restrictive sense.

What is claimed is:

1. A method of identifying drop words in a document image without performing character recognition, the document image including a first multiplicity of sentences and a second multiplicity of word occurrences, a processor implementing the method by executing instructions stored in electronic form in a memory coupled to the processor, the method comprising the steps of:
    a) analyzing the document image to identify word equivalence classes, each word equivalence class including at least one word occurrence of the second multiplicity of word occurrences;
    b) for each word equivalence class determining the likelihood that word equivalence class is a drop word;
    c) designating a number of the word equivalence classes as drop words based upon the likelihood that the word equivalence classes are drop words.

2. The method of claim 1 wherein each word equivalence class has a bounding box having a width and wherein the determination of step b) is based upon the width of the bounding boxes for each word equivalence class.

3. The method of claim 2 further comprising the step of:
    f) determining the number of occurrences of each word equivalence class in the document; and
    wherein step b) includes considering the number of times each word equivalence class occurs in the document.

4. The method of claim 3 further comprising the step of:
    g) identifying sentence boundaries within the document image;
    h) determining a number of times each word equivalence class is the first non-short word of a sentence; and
    wherein the determination step b) is further based upon the number of times each word equivalence class is the first non-short word of a sentence.

5. The method of claim 4 wherein step b) comprises:
    determining the relative likelihood that a word equivalence class is not a drop word using the formula:

$$L=(\omega_i/\omega_{the})*(1+b_i/f_i)+(c*W/f_i)$$

where:
    L is the indicator of the likelihood a word is not a drop word;
    $\omega_i$ is the width of the word i in pixels;
    $\omega_{the}$ is the width of the word "the" in pixels;
    $b_i$ is the number of times the word i occurs as the first non-short word of a sentence in one of the conforming text blocks;
    $f_i$ is the number of occurrences of the word i in the conforming text blocks;
    C is a constant weighting factor between the two terms; and
    W is the total number of word occurrences in the document.

6. The method of claim 1 further comprising the step of:
    f) determining the number of occurrences of each word equivalence class in the document; and
    wherein step b) includes considering the number of times each word equivalence class occurs in the document.

7. The method of claim 1 further comprising the step of:
    f) identifying sentence boundaries within the document image;
    g) determining a number of times each word equivalence class is the first non-short word of a sentence; and
    wherein the determination step b) is further based upon the number of times each word equivalence class is the first non-short word of a sentence.

8. A method of identifying drop words in a document image without performing character recognition, the document image including a first multiplicity of sentences and a second multiplicity of word occurrences, each word occurrence of the second multiplicity of word occurrences having a font size, a processor implementing the method by executing instructions stored in electronic form in a memory coupled to the processor, the method comprising the steps of:
    a) identifying a dominant font size within the document image;
    b) identifying sentence boundaries for sentences of the dominant font size within the document image;
    c) analyzing the document image to identify word equivalence classes of the dominant font size, each word equivalence class including at least one word occurrence of the second multiplicity of word occurrences;
    d) for each word equivalence class determining the likelihood that word equivalence class is not a drop word based upon a width of each word equivalence class, a number of occurrences of the word equivalence class, and a number of occurrences of the word equivalence class as a first non-short word of a sentence;
    e) designating a number of the word equivalence classes as drop words based upon the likelihood that the word equivalence classes are drop words.

9. The method of claim 8 wherein step d) comprises:
    determining the likelihood that a word equivalence class is not a drop word using the formula:

$$L=(\omega_i/\omega_{the})*(1+b_i/f_i)+(c*W/f_i)$$

where:
    L is an indicator of the likelihood a word is not a drop word;
    $\omega_i$ is the width of the word i in pixels;
    $\omega_{the}$ is the width of the word "the" in pixels;
    $b_i$ is the number of times the word i occurs as the first non-short word of a sentence in one of the conforming text blocks;
    $f_i$ is the number of occurrences of the word i in the conforming text blocks;
    C is a constant weighting factor between the two terms; and
    W is the total number of words in the document.

10. An article of manufacture comprising:
    a) a memory; and
    b) instructions stored in the memory for a method of identifying drop words in a document image without performing character recognition, the document image including a first multiplicity of sentences and a second multiplicity of word occurrences, method comprising the steps of:

1) analyzing the document image to identify word equivalence classes, each word equivalence class including at least one word occurrence of the second multiplicity of word occurrences;
2) for each word equivalence class determining the likelihood that word equivalence class is not a drop word;
3) designating a number of the word equivalence classes as drop words based upon the likelihood that the word equivalence classes are drop words.

11. An article of manufacture comprising:

a) a memory; and
b) instructions stored in the memory for a method of identifying drop words in a document image without performing character recognition, the document image including a first multiplicity of sentences and a second multiplicity of word occurrences, each word occurrence of the second multiplicity of word occurrences having a font size, the method comprising the steps of:

1) identifying a dominant font size within the document image;
2) identifying sentence boundaries for sentences of the dominant font size within the document image;
3) analyzing the document image to identify word equivalence classes of the dominant font size, each word equivalence class including at least one word occurrence of the second multiplicity of word occurrences;
4) for each word equivalence class determining the likelihood that word equivalence class is not a drop word based upon a width of each word equivalence class, a number of occurrences of the word equivalence, and a number of occurrences of the word equivalence class as a first non-short word of a sentence;
5) designating a number of the word equivalence classes as drop words based upon the likelihood that the word equivalence classes are drop words.

* * * * *